United States Patent
Vogel et al.

(10) Patent No.: US 9,568,349 B2
(45) Date of Patent: Feb. 14, 2017

(54) GAS FLOW MEASUREMENT SYSTEM AND METHOD OF OPERATION

(71) Applicant: Ruskin Company, Grandview, MO (US)

(72) Inventors: Timothy A. Vogel, Independence, MO (US); Josiah Wiley, Kansas City, MO (US)

(73) Assignee: RUSKIN COMPANY, Grandview, MO (US)

( * ) Notice: Subject to any disclaimer, the term of this patent is extended or adjusted under 35 U.S.C. 154(b) by 393 days.

(21) Appl. No.: 13/857,875

(22) Filed: Apr. 5, 2013

(65) Prior Publication Data
US 2014/0260597 A1 Sep. 18, 2014

Related U.S. Application Data

(60) Provisional application No. 61/798,528, filed on Mar. 15, 2013.

(51) Int. Cl.
*G05D 23/00* (2006.01)
*G01F 1/68* (2006.01)
(Continued)

(52) U.S. Cl.
CPC ............... *G01F 1/68* (2013.01); *G01F 1/684* (2013.01); *G01F 15/063* (2013.01); *G01D 4/006* (2013.01);
(Continued)

(58) Field of Classification Search
CPC .. G01F 15/061; G01F 15/063; G01F 25/0007; G01F 1/68; G01F 1/684; G01D 4/006; G01D 4/008
(Continued)

(56) References Cited

U.S. PATENT DOCUMENTS 4,080,821 A  3/1978 Johnston
4,345,463 A  8/1982 Wilson et al.
(Continued)

FOREIGN PATENT DOCUMENTS

DE  3841249 A1  7/1989
EP  1193477 A1  4/2002

OTHER PUBLICATIONS

"Probe." Merriam-Webster.com. Merriam-Webster, n.d. Web. Jan. 22, 2016 Accessed Online <http://www.merriam-webster.com/dictionary/probe>.*

*Primary Examiner* — Lisa Caputo
*Assistant Examiner* — Jonathan Dunlap
(74) *Attorney, Agent, or Firm* — Jackson Walker LLP; Christopher J. Rourk (57) ABSTRACT

A gas flow monitoring system is disclosed that includes a plurality of first gas flow sensors. A primary probe transmitter is connected to the plurality of first gas flow sensors is configured to process data received from the plurality of first gas flow sensors to generate first gas flow data. A plurality of second gas flow sensors are connected to an ancillary probe transmitter and to the primary probe transmitter, where the ancillary probe transmitter are configured to process data received from the plurality of second gas flow sensors to generate second gas flow data. The primary probe transmitter further comprises a building automation system interface, and is configured to receive the second gas flow data from the ancillary probe transmitter and to transmit the first gas flow data and the second gas flow data to a building automation system.

20 Claims, 6 Drawing Sheets

(51) Int. Cl.
  *G01F 1/684* (2006.01)
  *G01D 4/00* (2006.01)
  *G01F 15/06* (2006.01)
  *G01F 25/00* (2006.01)

(52) U.S. Cl.
  CPC ............ *G01D 4/008* (2013.01); *G01F 15/061* (2013.01); *G01F 25/0007* (2013.01)

(58) Field of Classification Search
  USPC .......... 340/870.02, 539.1, 10.31, 10.32, 632, 340/870.03; 700/276, 277; 702/45; 73/198, 73/861.21
  See application file for complete search history.

(56) References Cited

U.S. PATENT DOCUMENTS

| | | | |
|---|---|---|---|
| 4,494,406 A | 1/1985 | Komons et al. | |
| 4,581,930 A | 4/1986 | Komons | |
| 4,691,566 A | 9/1987 | Aine | |
| 4,835,521 A | 5/1989 | Andrejasich et al. | |
| 4,916,948 A | 4/1990 | Inada et al. | |
| 4,942,763 A | 7/1990 | Harpster | |
| 4,969,357 A | 11/1990 | Mickler | |
| 5,058,426 A | 10/1991 | Kobayashi | |
| 5,181,420 A | 1/1993 | Suzuki et al. | |
| 5,184,500 A | 2/1993 | Krcma et al. | |
| 5,355,727 A | 10/1994 | McQueen | |
| 5,419,190 A | 5/1995 | Boyd | |
| 5,606,513 A | 2/1997 | Louwagie et al. | |
| 5,684,472 A * | 11/1997 | Bane | 340/870.02 |
| 6,098,455 A | 8/2000 | Nukui et al. | |
| 6,895,069 B2 * | 5/2005 | Kim | 377/3 |
| 6,905,242 B2 | 6/2005 | Heuer et al. | |
| 7,664,573 B2 * | 2/2010 | Ahmed | 700/276 |
| 7,860,667 B2 * | 12/2010 | Vogel et al. | 702/45 |
| 8,070,423 B2 * | 12/2011 | Vogel et al. | 415/118 |
| 8,334,787 B2 * | 12/2012 | Bushman et al. | 340/870.02 |
| 8,833,390 B2 * | 9/2014 | Ball et al. | 137/552 |
| 2003/0084718 A1 | 5/2003 | Igarashi et al. | |
| 2004/0240602 A1 * | 12/2004 | Kim | 377/16 |
| 2005/0154494 A1 * | 7/2005 | Ahmed | 700/275 |
| 2006/0290525 A1 * | 12/2006 | Andersen et al. | 340/632 |
| 2009/0153357 A1 * | 6/2009 | Bushman et al. | 340/870.02 |
| 2009/0160637 A1 * | 6/2009 | Maeng | 340/539.1 |
| 2010/0088044 A1 * | 4/2010 | Vogel et al. | 702/45 |
| 2010/0143125 A1 * | 6/2010 | Vogel et al. | 416/61 |
| 2011/0066297 A1 * | 3/2011 | Saberi et al. | 700/287 |
| 2012/0046792 A1 * | 2/2012 | Secor | F24F 11/0086 700/276 |
| 2012/0305084 A1 * | 12/2012 | Ball et al. | 137/1 |
| 2013/0153062 A1 * | 6/2013 | Young et al. | 137/557 |
| 2014/0260665 A1 * | 9/2014 | Soreefan et al. | 73/861.21 |

* cited by examiner

GAS FLOW MEASUREMENT SYSTEM AND METHOD OF OPERATION

RELATED APPLICATIONS

This application claims benefit of U.S. Provisional Application No. 61/798,528, filed Mar. 15, 2013, entitled "GAS FLOW MEASUREMENT SYSTEM AND METHOD OF OPERATION," and is related to U.S. Pat. No. 7,860,667 issued Dec. 28, 2010, both of which are hereby incorporated by reference for all purposes as if set forth herein in their entirety.

TECHNICAL FIELD

The present disclosure relates generally to gas flow measurement, and more specifically to a gas flow measurement system and method of operation that allows for peer to peer communications between flow measurement devices.

BACKGROUND OF THE INVENTION

Currently available gas flow measurement devices generate analog signals that are sent to an externally wired control panel. The externally wired control panel interprets analog values and calculates gas flow measurement values. The externally wired control panel communicates the calculated flow information to a building automation system digitally or through analog signal. If more than one flow measurement device is required to provide adequate representation of the flow at any given measurement location within the system, these devices communicate with a separate control panel. The control panel utilizes code to calculate a flow that is an average of all the sensors circuits at that location. Currently, the typical system utilizes one to four measurement devices per flow measurement location. Each device may have up to four sensor circuits, with a maximum of sixteen sensor circuits for a give location. These sixteen sensor points, located on up to four flow measurement devices, communicate to a separate remote control panel that calculate an average flow at the measurement devices over long lines, where the sensor signal data can be exposed to noise or other data corruption. The building automation system communicates with the separate control panel, and does not communicate with flow measurement devices individually.

SUMMARY OF THE INVENTION

A gas flow monitoring system is disclosed that includes a plurality of first gas flow sensors. A primary probe transmitter is connected to the plurality of first gas flow sensors and is configured to process data received from the plurality of first gas flow sensors to generate first gas flow data. A plurality of second gas flow sensors are connected to an ancillary probe transmitter and to the primary probe transmitter, where the ancillary probe transmitter is configured to process data received from the plurality of second gas flow sensors to generate second gas flow data. The primary probe transmitter further comprises a building automation system interface, and is configured to receive the flow data from all ancillary probe transmitters connected in a digital communication network and transmits the first gas flow data and the second gas flow data from all ancillary probe transmitters to a building automation system.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

BRIEF DESCRIPTION OF THE SEVERAL VIEWS OF THE DRAWINGS

Aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views, and in which.

DETAILED DESCRIPTION OF THE INVENTION

In the description that follows, like parts are marked throughout the specification and drawings with the same reference numerals. The drawing figures might not be to scale and certain components can be shown in generalized or schematic form and identified by commercial designations in the interest of clarity and conciseness.

Figure 1:
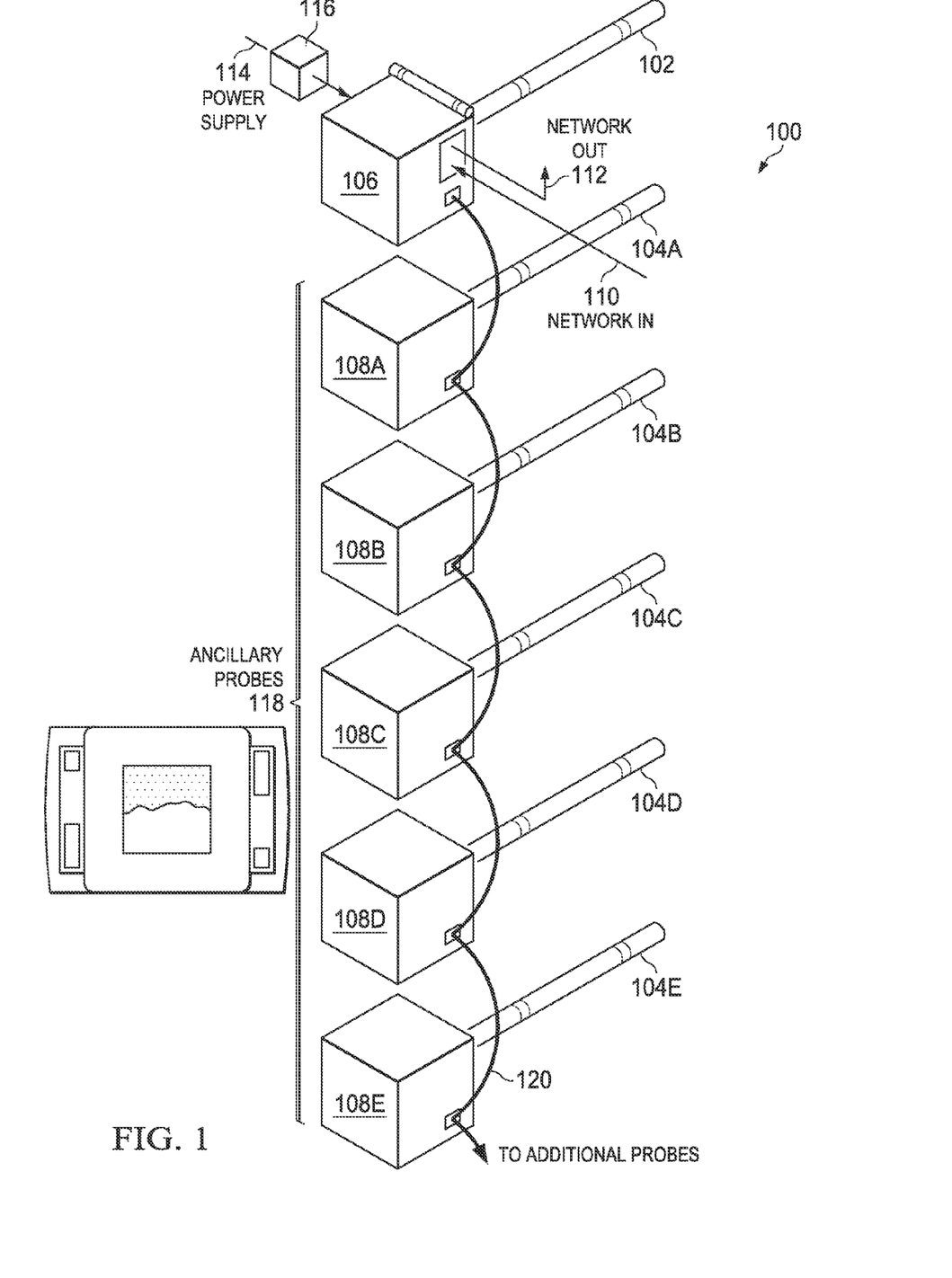
FIG. 1 is a diagram of a system for gas flow measurement in accordance with an exemplary embodiment of the present disclosure.

FIG. 1 is a diagram of a system 100 for gas flow measurement in accordance with an exemplary embodiment of the present disclosure. System 100 includes primary probe transmitter 106 and ancillary probe transmitters 108A through 108E. Primary probe transmitter 106 is coupled to air measurement probe assembly 102 and includes data processing and communications systems that can transmit and receive signals from air measurement probe assembly 102, which can include one or more sensors for measuring air flow and volume using differential pressure, thermal dispersion, hot wire anemometer, vortex shedding, heated mass or other suitable technologies, and can perform local processing of the signals to generate air flow data, air volume data or other suitable data. Primary probe transmitter 106 can also interface with a local display device on controller 118, can perform analysis of individual sensor signals, such as to detect sensors that are misoperating, that have been installed in a location that is shielded from air flow or subject to gusts, or that should otherwise be omitted from air flow readings. In one exemplary embodiment, primary probe transmitter 106 and air measurement probe assembly 102 can be similar to the systems and components described in U.S. Pat. No. 7,860,667, issued Dec. 28, 2010, entitled "Gas Measurement System," which is hereby incorporated by reference for all purposes as if set forth in its entirety.

As used herein, "hardware" can include a combination of discrete components, an integrated circuit, an application-specific integrated circuit, a field programmable gate array, or other suitable hardware. As used herein, "software" can include one or more objects, agents, threads, lines of code, subroutines, separate software applications, two or more lines of code or other suitable software structures operating in two or more software applications, on one or more processors (where a processor includes a microcomputer or other suitable controller, memory devices, input-output devices, displays, data input devices such as keyboards, peripherals such as printers and speakers, associated drivers, control cards, power sources, network devices, docking station devices, or other suitable devices operating under control of software systems in conjunction with the processor or other devices), or other suitable software structures. In one exemplary embodiment, software can include one or more lines of code or other suitable software structures operating in a general purpose software application, such as an operating system, and one or more lines of code or other suitable software structures operating in a specific purpose software application. As used herein, the term "couple" and its cognate terms, such as "couples" and "coupled," can include a physical connection (such as a copper conductor), a virtual connection (such as through randomly assigned memory locations of a data memory device), a logical connection (such as through logical gates of a semiconducting device), other suitable connections, or a suitable combination of such connections.

Primary probe transmitter 106 includes network connections 110 and 112, and is coupled to power supply 114 through power strip 116. Primary probe transmitter 106 is coupled to ancillary probe transmitters 108A through 108E over wire line serial connection 120. Each of ancillary probe transmitters 108A through 108E includes suitable processing systems and components to provide signals to and receive signals from sensors on air measurement probe assemblies 104A through 104E, respectively, and to process the signals to generate air flow data, air volume data and other suitable data. Ancillary probe transmitters 108A through 108E can also generate air flow data that includes readings attributable to individual sensors, and can process the air flow data for transmission to each other and to primary probe transmitter 106. In one exemplary embodiment, primary probe transmitter 106 can receive the air flow data from each of ancillary probe transmitters 108A through 108E and can transmit the air flow data in conjunction with air flow data generated by primary probe transmitter 106 to a building automation system or other suitable systems, such as by packetizing the data, by transmitting the data at predetermined times, by transmitting the data in response to prompts, or in other suitable manners. In another exemplary embodiment, primary probe transmitter 106 and ancillary probe transmitters 108A through 108E can communicate in a peer to peer manner with each other and with external systems, can communicate using an ad hoc wireless network, or can use other suitable communications media, system and protocols to allow existing wireless or wire line network communications to be used, to distribute processing and control of sensors to facilitate providing service to the sensors, and for other suitable purposes. Unlike prior art systems that required each measurement station to be connected to a remote processor using dedicated wire line connections and which only provided limited data to a building automation system through the remote processor, system 100 provides significantly improved flexibility and data availability at significantly lower cost.

In one exemplary embodiment, system 100 can utilize thermal dispersion technology to measure and report air velocity or volume. Primary probe transmitter 106 can be installed at one location in the air measurement station serial communication network and can include an expansion header to interface with a building automation system network. Primary probe transmitter 106 can include a plastic hinged enclosure that houses the associated electronic systems, and which can include suitable data communication circuitry, such as by using the MODBUS serial communications protocol or other suitable data communications systems or processes. Controller 118 can include a graphical LCD and touch screen interface and can be wired into the MODBUS network or other suitable communications media to allow an operator to perform system adjustment at or near primary probe transmitter 106 and ancillary probe transmitters 108A through 108E, to receive a visual indication of airflow and temperature, and to perform other suitable functions. Ancillary probe transmitters 108A through 108E can be installed in multiple openings such as the outside air, return air, and exhaust air of an air handling unit. Primary probe transmitter 106 can include a 16×2 LCD display with a five button overlay installed on the outside of the plastic box hinged cover or other suitable display and control systems.

Figure 2:
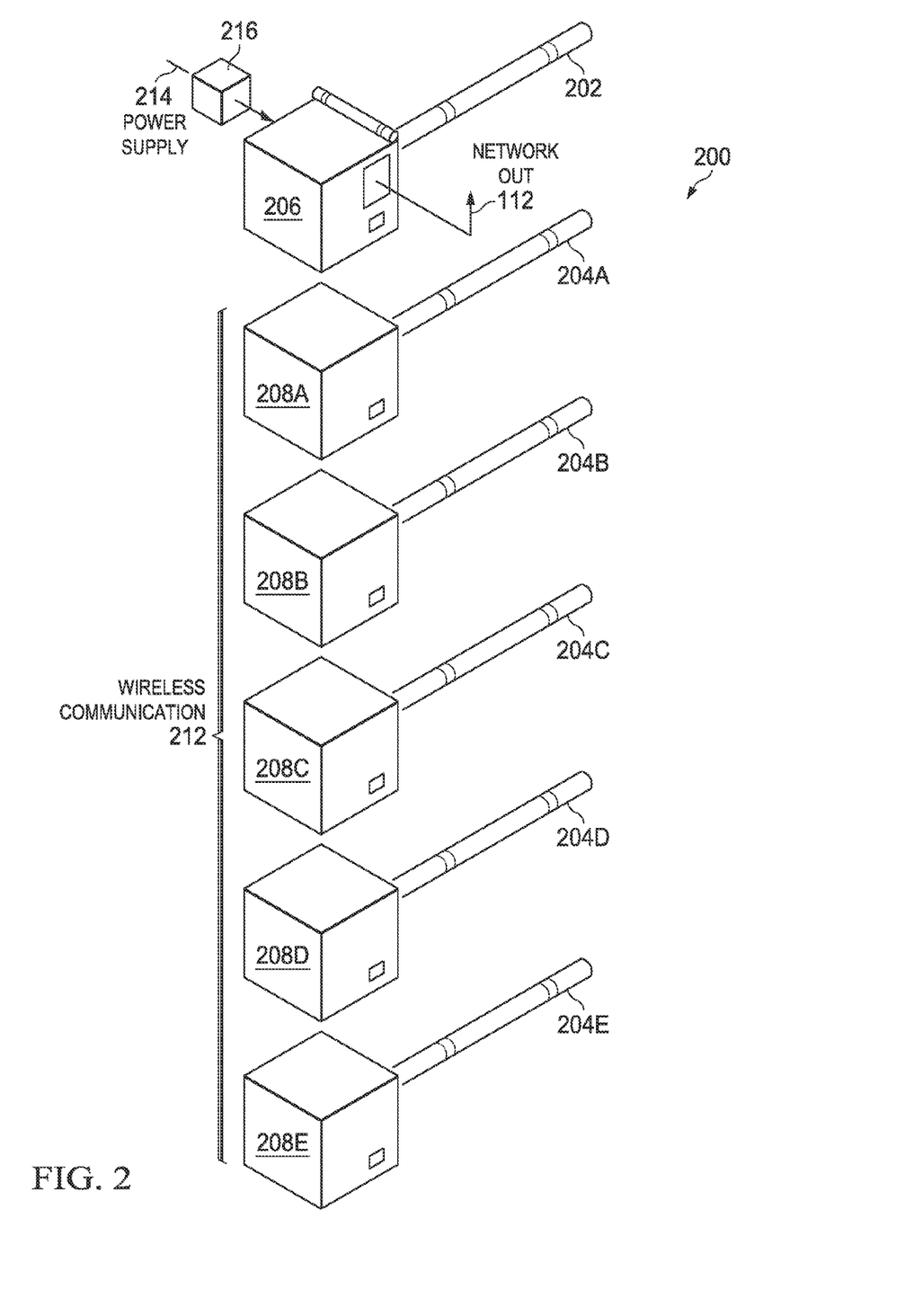
FIG. 2 is a diagram of a system for gas flow measurement in accordance with an exemplary embodiment of the present disclosure.

FIG. 2 is a diagram of a system 200 for gas flow measurement in accordance with an exemplary embodiment of the present disclosure. System 200 includes primary probe transmitter 206 and associated probe assembly 202, and ancillary probe transmitters 208A through 208E and associated probe assemblies 204A through 204E. Ancillary probe transmitters 208A through 208E communicate with each other and primary probe transmitter 206 over wireless network 212, which can be an IEEE 801.x wireless network or other suitable wireless networks.

Figure 3:
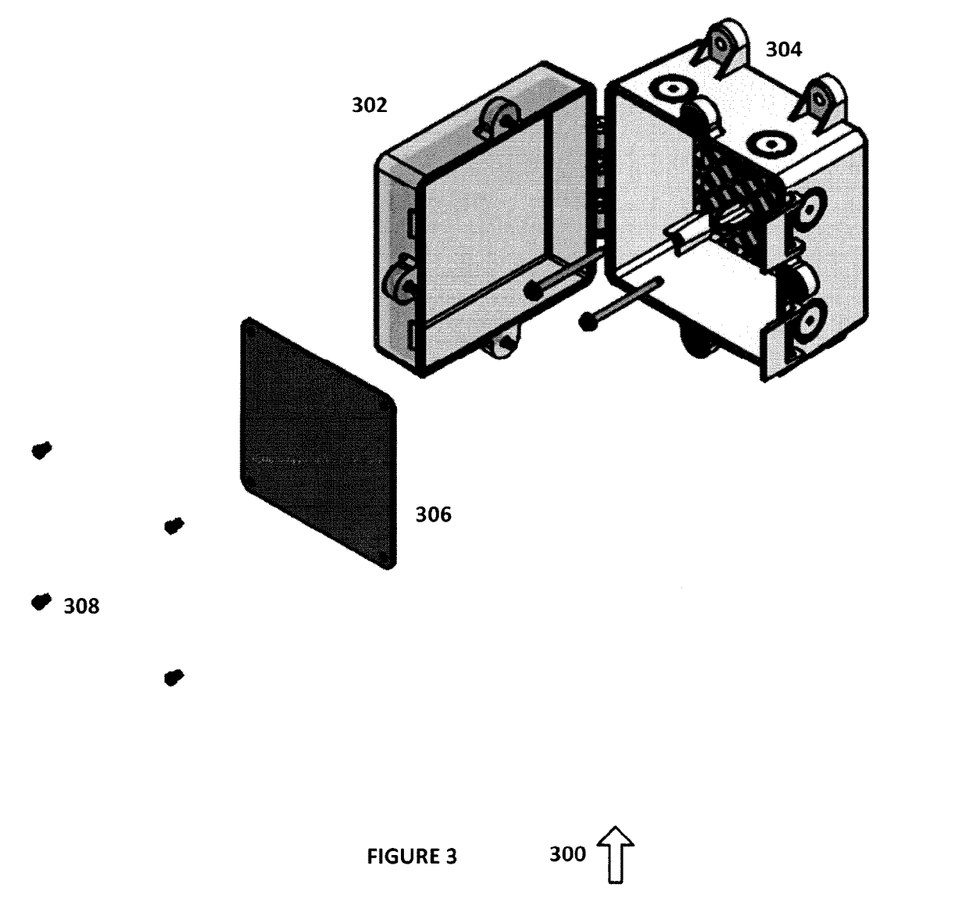
FIG. 3 is a diagram of a transmitter enclosure in accordance with an exemplary embodiment of the present disclosure.

FIG. 3 is a diagram of a transmitter enclosure 300 in accordance with an exemplary embodiment of the present disclosure. Transmitter enclosure 300 includes base 304 and hinged cover 302, which enclose circuit board 306. Circuit board 306 is secured to transmitter enclosure 300 using bolts 308. Circuit board 306 can be used to provide primary probe transmitter 106, ancillary probe transmitter 108 or other suitable circuits and systems to allow signals to be provided to and receive from sensors locally, without requiring long and dedicated communication lines with the sensors to be run through a noisy environment to a remote processor.

Figure 4:
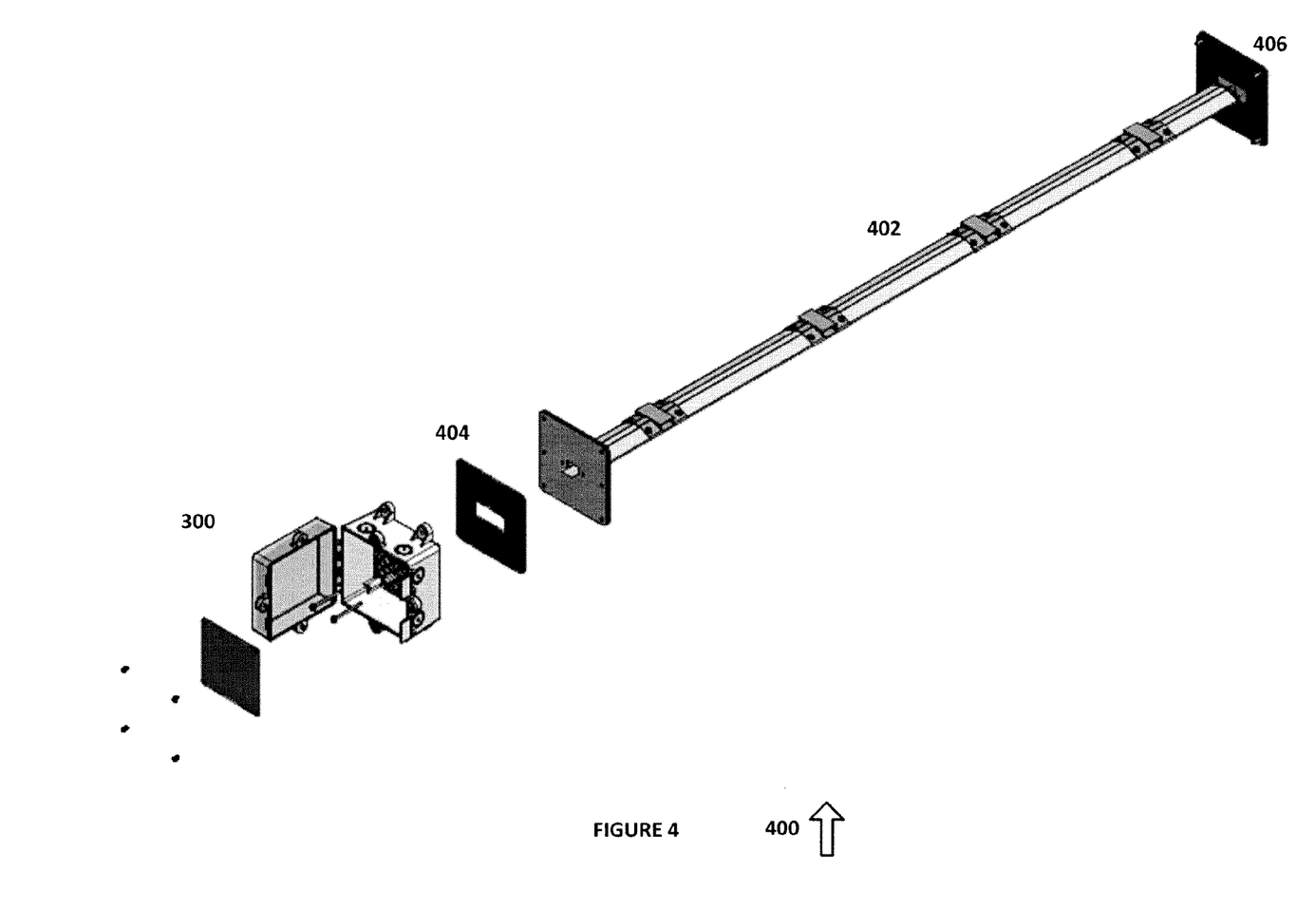
FIG. 4 is a diagram of a probe assembly in accordance with an exemplary embodiment of the present disclosure.

FIG. 4 is a diagram of a probe assembly 400 in accordance with an exemplary embodiment of the present disclosure. Probe assembly 400 includes support bar 402, which can be formed of aluminum or other suitable materials and which can include one or more sensors. Supports 404 and 406 can be used to secure support bar 402 to a duct, an air handling equipment enclosure, or other suitable locations. Transmitter enclosure 300 couples to support 404 and can receive wires from sensors on support bar 402, such as through the center of support bar 402 or in other suitable manners. In one exemplary embodiment, support bar 402 can include one or more energy harvesting devices, such as a micro turbine, to allow energy for operating primary probe transmitter 106, ancillary probe transmitter 108 or other suitable systems or components to be generated locally from the air flow that is being measured, so to allow components of the air flow monitoring system that are capable of wireless communications to be installed without the need for routing power cables to each monitoring station.

Figure 5:
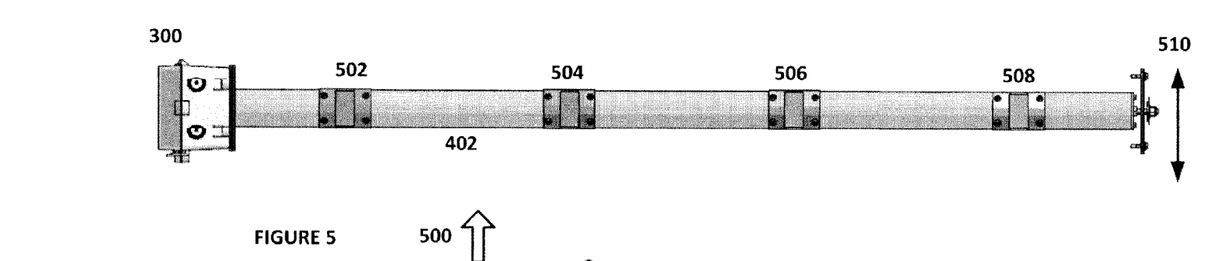
FIG. 5 is a diagram of a probe assembly in accordance with an exemplary embodiment of the present disclosure.

FIG. 5 is a diagram of a probe assembly 400 in accordance with an exemplary embodiment of the present disclosure. Probe assembly 400 includes sensor assemblies 502 through 508, which are located at one or more predetermined locations along support bar 402. In operation, air flow in either direction shown by arrow 510 causes sensors 502 through 508 to generate signals that can be processed to generate air flow data.

Figure 6:
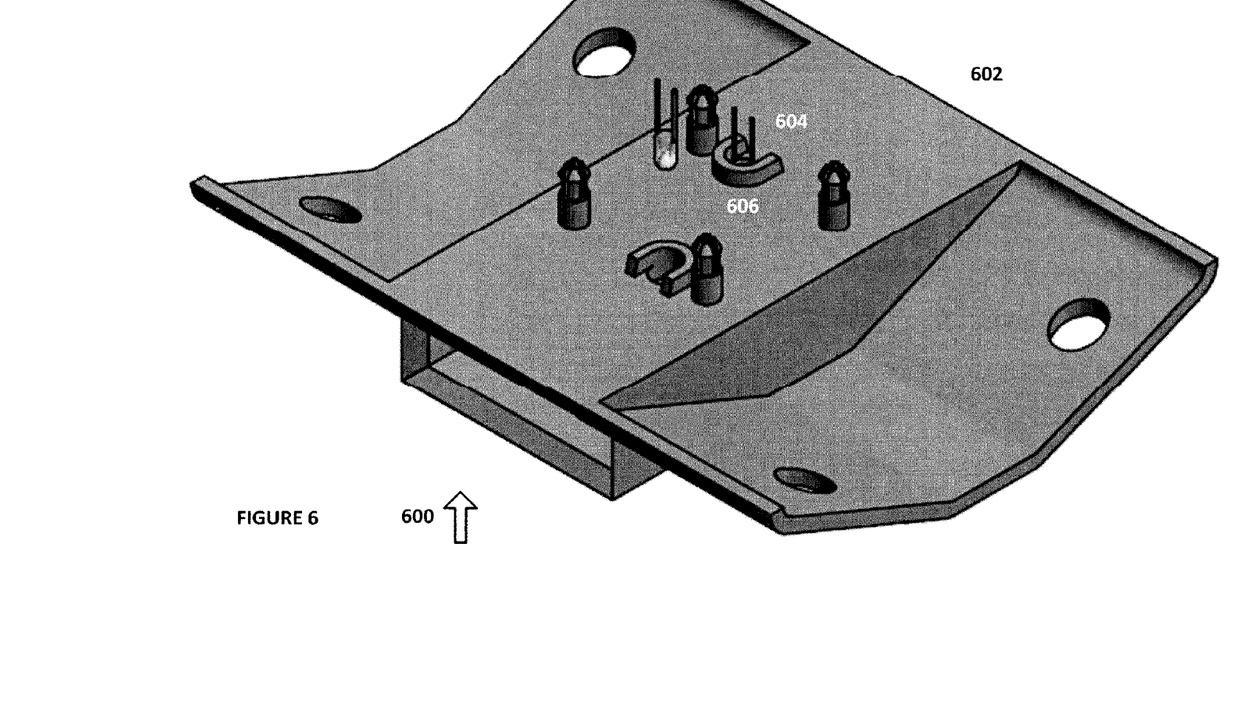
FIG. 6 is a diagram of a sensor hood assembly in accordance with an exemplary embodiment of the present disclosure.

FIG. 6 is a diagram of a sensor hood assembly 600 in accordance with an exemplary embodiment of the present disclosure. Sensor hood assembly 600 includes sensor hood 602, which can be formed from acrylonitrile butadiene styrene (ABS) or other suitable materials, and includes thermistor 604, which can be used for self-heating, ambient temperature measurement or other suitable purposes. Thermistor 604 can be secured directly to sensor hood 602 with epoxy or in other suitable manners. The thermistor leads can be attached directly to wire by a crimping tool or in other suitable manners, and heat shrink tubing can be used to insulate and protect the connection. The thermistor wires can run through an aluminum extrusion of support bar 402 to primary probe transmitter 106, ancillary probe transmitter 108 or other suitable circuits or systems that are mounted on the end of the air measurement probe assembly inside the plastic enclosure with hinged lid.

Figure 7:
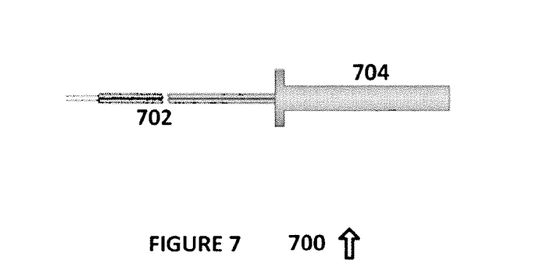
FIG. 7 is a diagram of a thermistor in accordance with an exemplary embodiment of the present disclosure.

FIG. 7 is a diagram of a thermistor 700 in accordance with an exemplary embodiment of the present disclosure. Thermistor 700 includes two solid nickel conductors 702 with heavy polyurethane nylon insulation and sensor element 704.

Figure 8:
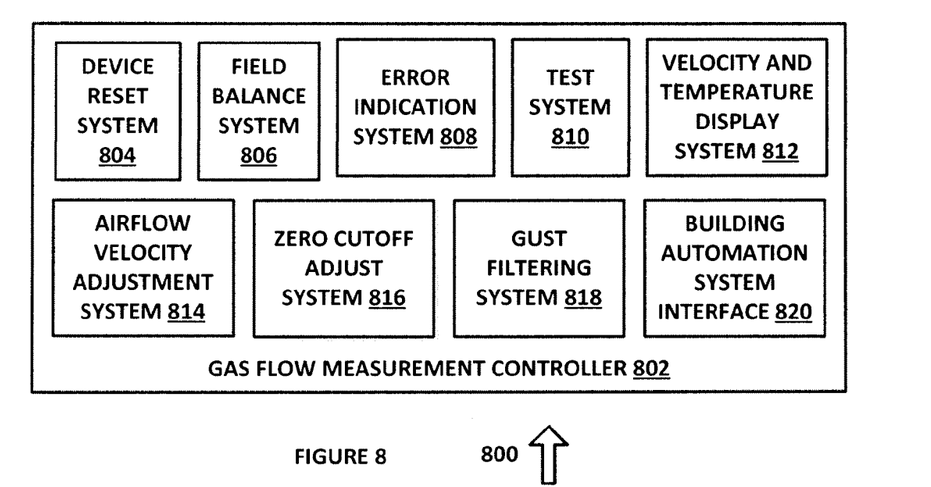
FIG. 8 is a diagram of a control interface in accordance with an exemplary embodiment of the present disclosure.

FIG. 8 is a diagram of a control interface 800 in accordance with an exemplary embodiment of the present disclosure. Control interface 800 can be implemented in hardware or a suitable combination of hardware and software, and can be one or more software systems operating on a processor. In one exemplary embodiment, control interface 800 can be generated at a touch screen controller that operates in conjunction with one or more of primary probe transmitter 106 and ancillary probe transmitters 108 or in other suitable manners.

Control interface 800 includes gas flow measurement controller 802, which can be implemented in conjunction with a primary probe transmitter, an ancillary probe transmitter, a touch screen controller or other suitable systems. Gas flow measurement controller 802 includes device reset system 804, field balance system 806, error indication system 808, test system 810, velocity and temperature display system 812, airflow velocity adjustment system 814, zero cutoff adjust system 816 and gust filtering system 818. Gas flow measurement controller transmits signals to and receives signals from a plurality of sensors, such as a plurality of thermistors for self-heating, a plurality of thermistors for ambient temperature measurement, or other suitable sensors, and processes the data to generate air flow data, such as velocity data or volume data.

Device reset system 804 generates a user control and processes user-entered commands to reset one or more devices. In one exemplary embodiment, device reset system 804 can be implemented using one or more objects that have associated graphical, data and control attributes. Device reset system 804 can interface with one or more devices associated with a primary probe controller, an ancillary probe controller or other suitable systems, such as to reset the primary probe controller or ancillary probe controller, to reset one or more air measurement device settings, or to perform other suitable functions.

Field balance system 806 generates a user control and processes user-entered commands to balance one or more networked air measurement devices. In one exemplary embodiment, field balance system 806 can be implemented using one or more objects that have associated graphical, data and control attributes. Field balance system 806 can interface with one or more networked air measurement devices associated with a primary probe controller, an ancillary probe controller or other suitable systems, such as to allow personnel to balance networked air measurement devices in the vicinity of field balance system 806, or to perform other suitable functions.

Error indication system 808 generates a user control and processes user-entered commands to display error data, such as device or sensor error data. In one exemplary embodiment, error indication system 808 can be implemented using one or more objects that have associated graphical, data and control attributes. Error indication system 808 can interface with one or more devices associated with a primary probe controller, an ancillary probe controller or other suitable systems, such as to receive error signals and to translate the error signals to user readable displays, or to perform other suitable functions.

Test system 810 generates a user control and processes user-entered commands to test one or more devices. In one exemplary embodiment, test system 810 can be implemented using one or more objects that have associated graphical, data and control attributes. Test system 810 can interface with one or more devices associated with a primary probe controller, an ancillary probe controller or other suitable systems, such as to generate a sequence of data signals or test signals to determine whether response signals generated by the devices indicate that the devices are functioning properly, or to perform other suitable functions.

Velocity and temperature display system 812 generates a user control and processes user-entered commands to display velocity and temperature data for air measurement devices. In one exemplary embodiment, velocity and temperature display 812 can be implemented using one or more objects that have associated graphical, data and control attributes. Velocity and temperature display 812 can generate velocity and temperature data for individual sensors or sets of sensors, such as to allow personnel to compare independent velocity and temperature measurements with velocity and temperature measures for one or more air measurement devices in the vicinity of velocity and temperature system 812, or to perform other suitable functions.

Airflow velocity adjustment system 814 generates a user control and processes user-entered commands to adjust gain and offset of airflow velocity measurements. In one exemplary embodiment, airflow velocity adjustment system 814 can be implemented using one or more objects that have associated graphical, data and control attributes. Airflow velocity adjustment system 814 can interface with gain and offset controls for one or more air measurement devices associated with a primary probe controller, an ancillary probe controller or other suitable systems, such as to allow personnel to adjust gain and offset for air measurement devices in the vicinity of airflow velocity adjustment system 814, or to perform other suitable functions.

Zero cutoff adjust system 816 generates a user control and processes user-entered commands to adjust or establish a zero cutoff value for a selected airflow station. In one exemplary embodiment, zero cutoff adjust system 816 can be implemented using one or more objects that have associated graphical, data and control attributes. Zero cutoff adjust system 816 can interface with one or more air measurement devices associated with a primary probe controller, an ancillary probe controller or other suitable systems, such as to allow personnel to establish a zero cutoff value, or to perform other suitable functions.

Gust filtering system 818 generates a user control and processes user-entered commands to perform gust filtering and velocity measurement averaging for a plurality of sensor signals. In one exemplary embodiment, gust filtering system 818 can be implemented using one or more objects that have associated graphical, data and control attributes. Gust filtering system 818 can interface with one or more air measurement devices associated with a primary probe controller, an ancillary probe controller or other suitable systems, such as to perform gust filtering or velocity measurement averaging, or to perform other suitable functions.

Building automation system interface 820 receives data from gas flow measurement controller 802 and interfaces with a building automation system to receive and transmit data. In one exemplary embodiment, a building automation system can be configured to access the additional data that is available from gas flow measurement controller 802 to provide better data for the purposes of determining the state of the air handling system, to identify misoperating equipment, to control air handling equipment to optimize performance, or for other suitable purposes.

Figure 9:
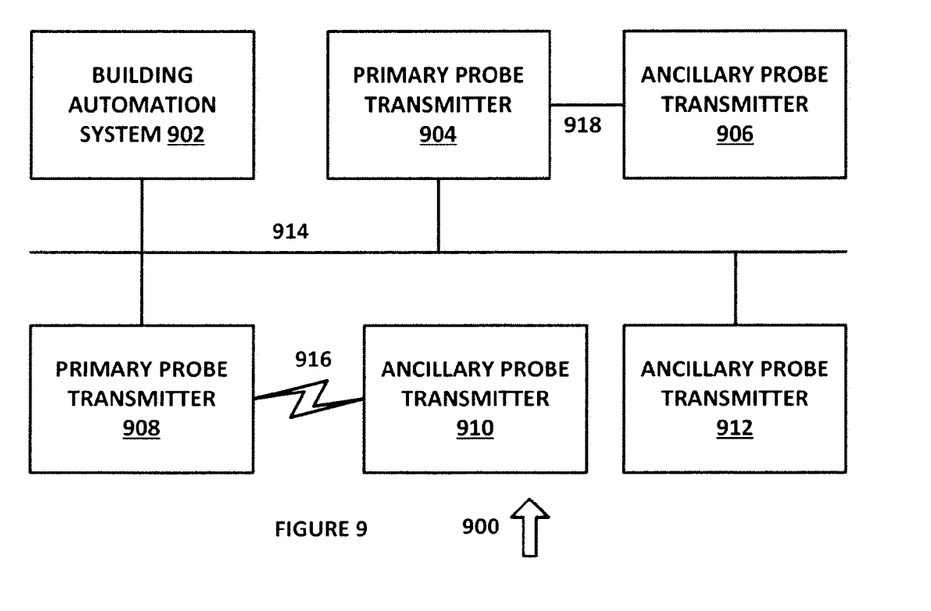
FIG. 9 is a diagram of a system for managing an air handling system in accordance with an exemplary embodiment of the present disclosure.

FIG. 9 is a diagram of a system 900 for managing an air handling system in accordance with an exemplary embodiment of the present disclosure. System 900 includes building automation system 902, which can receive data from a plurality of different systems over network 914, such as lighting data, power consumption data, alarm data and heating, ventilating and air conditioning (HVAC) data. Network 914 can be a wire line network such as an Ethernet network, an optical network, a wireless network, other suitable networks or a suitable combination of such networks.

Primary probe transmitters 904 and 908 receive data from sensors and generate HVAC data that is transmitted to building automation system 902 over network 914. Primary probe transmitter 904 receives data from sensors at ancillary probe transmitter 906, HVAC data from ancillary probe transmitter 906 or other suitable data over serial or parallel communication link 918 and processes the data for transmission over network 914, such as by compiling the data into a predetermined data packet format, by generating the data in response to a query from building automation system 902 or in other suitable manners. Primary probe transmitter 908 receives data from sensors at ancillary probe transmitter 910, HVAC data from ancillary probe transmitter 910 or other suitable data over wireless network 916 and processes the data for transmission over network 914, such as by compiling the data into a predetermined data packet format, by generating the data in response to a query from building automation system 902 or in other suitable manners. Likewise, where suitable, ancillary probe transmitter 912 can communicate directly with building automation system 902 or other suitable systems, such as personal data device. In this manner, building automation system 902 can receive data from individual air monitoring stations or even individual sensors, if desired, and data processing of sensor data for HVAC data can be distributed to local probe transmitters, can also or alternatively be performed centrally at building automation system 902 or other suitable processes can also or alternatively be implemented.

In one exemplary embodiment, system 100 and the other systems and components described herein can facilitate processing and control of sensors to generate air flow data. In this exemplary embodiment, a method for monitoring gas flow can be used that includes receiving a data signal from each of a plurality of first gas flow sensors at primary probe transmitter 106, which processes the plurality of first gas flow sensor data signals to generate first gas flow data. A data signal can be received from each of a plurality of second gas flow sensors at an ancillary probe transmitter 108, which can process the plurality of second gas flow sensors data signals to generate second gas flow data. Likewise, additional ancillary probe transmitters and sensors can be used where suitable.

The second gas flow data is transmitted to primary probe transmitter 106 over a first communications media, such as serial communication media, a wireless network or other suitable media, and primary probe transmitter 106 assembles the first gas flow data and the second gas flow data for transmission over a network, such as a wire line network, a wireless network or other suitable data networks. Primary probe transmitter 106 then transmits the first gas flow data and the second gas flow data to a building automation system.

In one exemplary embodiment, data signals can be received from one or more thermistors for self-heating ambient temperature measurement. Gas flow data can be generated from data received from each of the first gas flow sensors, such as velocity data, volume data, temperature data or other suitable data. The data from the gas flow sensors can be processed to determine whether individual sensor signals should be omitted from gas flow data generated by primary probe transmitter 106, ancillary probe transmitter 108 or other suitable systems, such in response to testing of the gas flow sensors for operability.

It should be emphasized that the above-described embodiments are merely examples of possible implementations. Many variations and modifications may be made to the above-described embodiments without departing from the principles of the present disclosure. All such modifications and variations are intended to be included herein within the scope of this disclosure and protected by the following claims.

What is claimed is:

1. A gas flow monitoring system comprising:
a plurality of first gas flow sensors;
a primary probe transmitter coupled to the plurality of first gas flow sensors and configured to process data received from the plurality of first gas flow sensors to generate first gas flow data at a first location within a duct;
a plurality of second gas flow sensors;
an ancillary probe transmitter coupled to the plurality of second gas flow sensors and to the primary probe transmitter, the ancillary probe transmitter configured to process data received from the plurality of second gas flow sensors to generate second gas flow data at a second location within the duct; and
the primary probe transmitter further comprising a building automation system interface and configured to receive the second gas flow data from the ancillary probe transmitter, to process the first gas flow data and the second gas flow data to generate first processed data, and to transmit the first gas flow data, the second gas flow data and the first processed data to a building automation system.

2. The gas flow monitoring system of claim 1 wherein the primary probe transmitter is coupled to the ancillary probe transmitter over a wireless network and the primary probe transmitter is coupled to the building automation system over a wire line network, and further comprising a device reset system configured to generate a user interface identifying a plurality of devices associated with the primary probe transmitter and the ancillary probe transmitter and to receive a user-entered command to reset one of the plurality of devices.

3. The gas flow monitoring system of claim 1 wherein the plurality of first gas flow sensors comprise a first plurality of thermistors for self-heating and a first plurality of thermistors for ambient temperature measurement that are disposed at spaced locations along a single probe that is configured for insertion into a duct, and further comprising a field balance system configured to generate a user interface identifying a plurality of sensors associated with the primary probe transmitter and the ancillary probe transmitter and to receive locally-measured, user-entered data to balance a reading associated with one of the plurality of sensors.

4. The gas flow monitoring system of claim 3 wherein the primary probe transmitter further comprises an error indication system configured to receive an error signal from each of the plurality of thermistors for self-heating, the primary probe transmitter and the ancillary probe transmitter and to and to generate a user-readable indication as a function of each of the error signals.

5. The gas flow monitoring system of claim 1 wherein the first gas flow data comprises gas flow data for each of the plurality of first gas flow sensors disposed at spaced positions along a single support that has been installed within a duct, and further comprising a test system configured to generate a user interface identifying each of the plurality of first gas flow sensors and second gas flow sensors, the primary probe transmitter and the ancillary probe transmitter, to generate a sequence of data signals and to determine whether response signals generated by the each of the plurality of first gas flow sensors and second gas flow sensors, the primary probe transmitter and the ancillary probe transmitter indicate that each of the plurality of first gas flow sensors and second gas flow sensors, the primary probe transmitter and the ancillary probe transmitter are functioning properly.

6. The gas flow monitoring system of claim 1 wherein the first gas flow data comprises one or more of velocity data and volume data measured at a plurality of sensors disposed at separate locations within a duct, and further comprising a velocity and temperature display system configured to generate a user interface identifying each of the plurality of first gas flow sensors and second gas flow sensors, and to generate velocity and temperature data for individual sensors or sets of sensors of each of the plurality of first gas flow sensors and second gas flow sensors.

7. The gas flow monitoring system of claim 1 further comprising a touch screen controller coupled to the primary probe transmitter and configured to generate one or more user prompts and to receive user-entered selections of probe locations within ductwork in response to the user prompts, and further comprising an airflow velocity adjustment system configured to generate a user interface with gain and offset controls for each of the plurality of first gas flow sensors and second gas flow sensors and to receive locally-measured adjustments to the gain and offet measurements for each of the plurality of first gas flow sensors and second gas flow sensors.

8. The gas flow monitoring system of claim 1 further comprising:
a first housing containing the primary probe transmitter, the first housing configured to be attached to at a first location;
a first sensor support coupled to the first housing and the air flow component at the first location, wherein the plurality of first gas flow sensors are disposed on the first sensor support; and
a zero cutoff adjust system configured to generate a user interface with zero cutoff controls for each of the plurality of first gas flow sensors and second gas flow sensors and to receive locally-measured adjustments to a zero cutoff setting for each of the first gas flow sensors and second gas flow sensors.

9. The gas flow monitoring system of claim 8 further comprising:
a second housing containing the ancillary probe transmitter, the second housing configured to be attached to the air flow component at a second location;
a second sensor support coupled to the second housing and the air flow component at the second location, wherein the plurality of second gas flow sensors are disposed on the second sensor support, and
a gust filtering system coupled to the plurality of first gas flow sensors and second gas flow sensors and configured to perform gust filtering as a function of data received from the plurality of first gas flow sensors and second gas flow sensors.

10. A method for monitoring gas flow comprising:
receiving a data signal from each of a plurality of first gas flow sensors at a primary probe transmitter;
processing the plurality of first gas flow sensor data signals to generate first gas flow data;
receiving a data signal from each of a plurality of second gas flow sensors at an ancillary probe transmitter;
processing the plurality of second gas flow sensors data signals to generate second gas flow data;
transmitting the second gas flow data to the primary probe transmitter over a first communications media;
processing the first gas flow data and the second gas flow data to generate first processed data as a function of the first gas flow data and the second gas flow data;
assembling the first gas flow data, the second gas flow data and the first processed data into a data packet for transmission over a network at the primary probe transmitter; and
transmitting the first gas flow data, the second gas flow data and the first processed data from the primary probe transmitter to a building automation system.

11. The method of claim 10 wherein receiving the data signal from each of the plurality of first gas flow sensors at the primary probe transmitter comprises receiving a data signal from one or more thermistors for self-heating and a data signal from one or more thermistors for ambient temperature measurement.

12. The method of claim 11 wherein processing the plurality of first gas flow sensor data signals to generate the first gas flow data comprises generating first gas flow data for each of the plurality of first gas flow sensors.

13. The method of claim 11 wherein processing the plurality of first gas flow sensor data signals to generate the first gas flow data comprises generating one or more of velocity data and volume data.

14. The method of claim 11 wherein processing the plurality of first gas flow sensor data signals to generate the first gas flow data comprises generating one or more of velocity data and volume data for each of the plurality of first gas flow sensors.

15. The method of claim 11 further comprising determining whether one or more of the plurality of first gas flow sensor data signals should be omitted from the first gas flow data at the primary probe transmitter.

16. The method of claim 11 further comprising:
generating a user interface identifying a plurality of devices associated with the primary probe transmitter and the ancillary probe transmitter;
receiving a user-entered command to reset one of the plurality of devices;
generating a user interface identifying a plurality of first gas flow sensors and second gas flow sensors associated with the primary probe transmitter and the ancillary probe transmitter;
receiving locally-measured, user-entered data;
balancing a reading associated with one of the plurality of first gas flow sensors and second gas flow sensors;
generating a user interface identifying each of the plurality of first gas flow sensors and second gas flow sensors, the primary probe transmitter and the ancillary probe transmitter;
generating a sequence of data signals;
testing each of the plurality of first gas flow sensors for operability with the primary probe transmitter;
determining whether response signals generated by the first gas flow sensors indicate that the devices are functioning properly;
generating a user interface identifying each of the plurality of first gas flow sensors and second gas flow sensors;
generating velocity and temperature data for individual sensors or sets of sensors;
generating a user interface with gain and offset controls for each of the plurality of first gas flow sensors and second gas flow sensors;
receiving locally-measured adjustments to the gain and offet measurements;
generating a user interface with zero cutoff controls for each of the plurality of first gas flow sensors and second gas flow sensors;
receiving locally-measured adjustments to a zero cutoff setting for each of the first gas flow sensors and second gas flow sensors; and
performing gust filtering as a function of data received from the plurality of first gas flow sensors and second gas flow sensors.

17. A method for monitoring gas flow comprising:
receiving a data signal from each of a plurality of first gas flow sensors at a primary probe transmitter;
processing the plurality of first gas flow sensor data signals at the primary probe tansmitter to generate first gas flow data and first processed data;
receiving a data signal from each of a plurality of second gas flow sensors at a first ancillary probe transmitter;
processing the plurality of second gas flow sensors data signals at the primary probe transmitter to generate second gas flow data and second processed data;
receiving a data signal from each of a plurality of third gas flow sensors at a second ancillary probe transmitter;
processing the plurality of third gas flow sensors data signals at the primary probe transmitter to generate third gas flow data and third processed data; and
transmitting the first gas flow data, the second gas flow data, the third gas flow data, the first processed data, the second processed data and the third processed data from the primary probe transmitter to a building automation system, wherein the first processed data, the second processed data and the third processed data are different types of data.

18. The method of claim 17 wherein receiving the data signal from each of the plurality of first gas flow sensors at the primary probe transmitter comprises receiving a data signal from one or more thermistors for self-heating and a data signal from one or more thermistors for ambient temperature measurement.

19. The method of claim 17 wherein processing the plurality of first gas flow sensor data signals to generate the first gas flow data comprises generating first gas flow data for each of the plurality of first gas flow sensors.

20. The method of claim 17 wherein processing the plurality of first gas flow sensor data signals to generate the first gas flow data comprises generating one or more of velocity data and volume data.

* * * * *

UNITED STATES PATENT AND TRADEMARK OFFICE
CERTIFICATE OF CORRECTION

| | | |
|---|---|---|
| PATENT NO. | : 9,568,349 B2 | Page 1 of 1 |
| APPLICATION NO. | : 13/857875 | |
| DATED | : February 14, 2017 | |
| INVENTOR(S) | : Timothy A. Vogel and Josiah Wiley | |

It is certified that error appears in the above-identified patent and that said Letters Patent is hereby corrected as shown below:

On the Title Page

1. In Item (57), under "ABSTRACT", in Column 2, Line 4, delete "is configured" and insert -- and is configured --, therefor.

In the Claims

2. In Column 9, Line 31, in Claim 4, delete "and to and to generate" and insert -- and to generate --, therefor.

3. In Column 9, Line 42, in Claim 5, delete "by the each" and insert -- by each --, therefor.

4. In Column 10, Line 1, in Claim 7, delete "offet" and insert -- offset --, therefor.

5. In Column 11, Line 41, in Claim 16, delete "offet" and insert -- offset --, therefor.

6. In Column 12, Line 11, in Claim 17, delete "tansmitter" and insert -- transmitter --, therefor.

Signed and Sealed this
Fourth Day of July, 2017

Joseph Matal
*Performing the Functions and Duties of the*
*Under Secretary of Commerce for Intellectual Property and*
*Director of the United States Patent and Trademark Office*